Figure 1A:
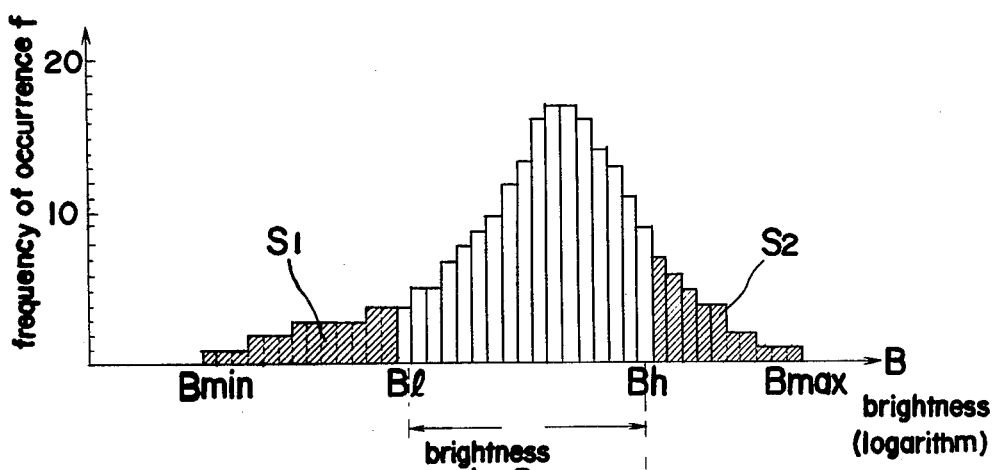

United States Patent [19]

Yamada et al.

[11] 4,182,573
[45] Jan. 8, 1980

[54] EXPOSURE METER

[75] Inventors: Seiji Yamada, Sakai; Ichiro Yoshiyama, Kobe; Mashio Kitaura, Tondabayashi, all of Japan

[73] Assignee: Minolta Camera Kabushiki Kaisha, Osaka, Japan

[21] Appl. No.: 824,950

[22] Filed: Aug. 15, 1977

[30] Foreign Application Priority Data

Sep. 13, 1976 [JP] Japan .................. 51-110528

[51] Int. Cl.² ............... G03B 7/08; G01J 1/42
[52] U.S. Cl. .................. 356/218; 356/222; 354/23 D; 354/31
[58] Field of Search ............... 356/218, 222, 223, 224, 356/226, 227; 354/23 R, 23 D, 31, 53

[56] References Cited

U.S. PATENT DOCUMENTS

| | | | |
|---|---|---|---|
| 3,971,046 | 7/1976 | Nobusawa | 354/24 |
| 4,032,801 | 6/1977 | Fulkerson | 354/24 X |
| 4,047,187 | 9/1977 | Mashimo et al. | 354/23 D |

Primary Examiner—Rolf G. Hille
Attorney, Agent, or Firm—Wenderoth, Lind & Ponack

[57] ABSTRACT

An exposure meter for use in photography which includes means for measuring brightness at a plurality of places in a scene to be measured for exposure, means for calculating frequency distribution of the brightness which divides brightness value into many stages and counts frequency of occurrence of brightness at each of the stages, and means for calculating, under designated conditions, position whereat film latitude is to be present within the width of the brightness distribution.

8 Claims, 23 Drawing Figures

F/G. 7
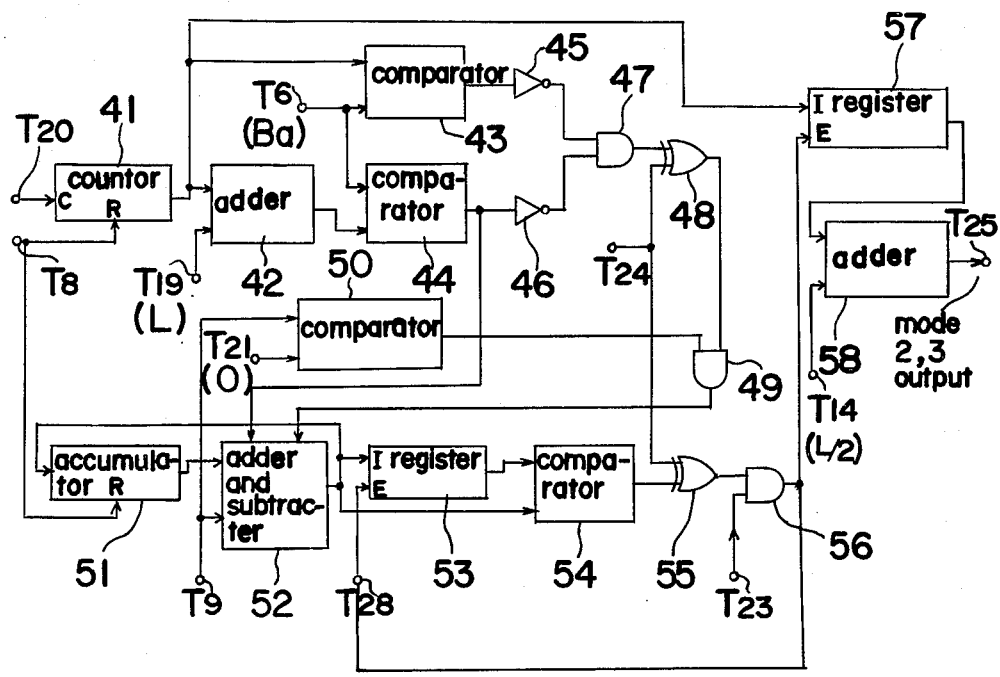
F/G. 8
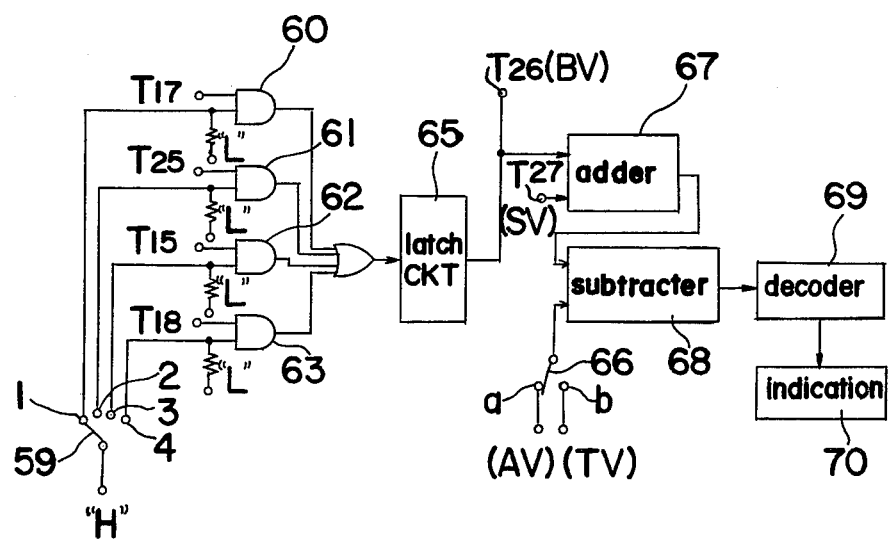

EXPOSURE METER

The present invention relates to photography and more particularly, to an exposure meter for use in photography.

Commonly, in actual photographing or picture taking, the amount of exposure of film to an object or scene to be photographed is not one set value, but is a factor to be selected in accordance with the intention of the photographer, with effects to resultant photographs taken into account. Meanwhile, exposure meters which have been proposed up to the present are based on only one exposure determination system. In other words, the conventional exposure determination system currently in wide use in photography determines the exposure amount so that the brightness of one part of the scene to be photographed or the average brightness of the entire scene to be photographed is brought to approximately the central portion of the latitude of a film employed. Accordingly, to obtain photographs particularly meeting a photographer's intention, it is necessary for the photographer to determine the actual exposure by suitably adjusting or shifting the exposure amount from that indicated by the exposure meter. This which procedure, however, requires a great deal of experience and skill on the part of the photographer in suitably adjusting or shifting the exposure meter indication to meet his intention.

Accordingly, an essential object of the present invention is to provide an exposure meter for use in photography which enables any photographer to determine the exposure amount meeting his intention more rationally than in conventional exposure meters without depending on experience or particular skill.

Another important object of the present invention is to provide an exposure meter of the above described type which makes it possible for any person to readily take photographs meeting his particular intention in the amount of exposure.

A further object of the present invention is to provide an exposure meter of the above described type in which various exposure determination systems can be achieved through a simple change over operation.

A still further object of the present invention is to provide an exposure meter of the above described type in which the brightness values at a plurality of points of a scene to be photographed are subjected to various calculations to achieve a plurality of kinds of exposure determinations.

Another object of the present invention is to provide an exposure meter of the above described type which is accurate in function and simple in construction.

In accomplishing these and other objects, according to one preferred embodiment of the present invention, the exposure meter includes a means for measuring brightness at the plurality of places in a scene to be measured for exposure, a means for calculating the frequency distribution of brightness values by dividing the brightness values into many brightness ranges and counting the number of measured brightness values occurring within each of the brightness ranges, and a means for calculating, under designated conditions, the position at which the film latitude is to be placed within the width of the brightness distribution. Thus a number of exposure amount determination systems can be realized by a simple change-over operation, thereby providing an exposure meter which enables any person to obtain photographs exactly meeting his intention with substantial elimination of the disadvantages inherent in the conventional exposure meters.

Figure 1B:
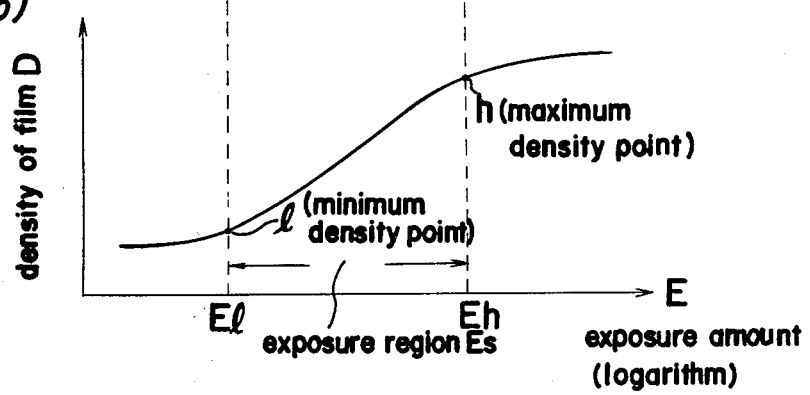
Figure 2A:
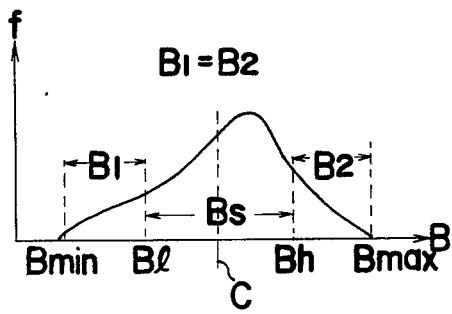
Figure 2B:
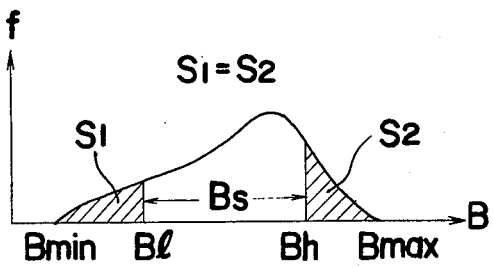
Figure 2C:
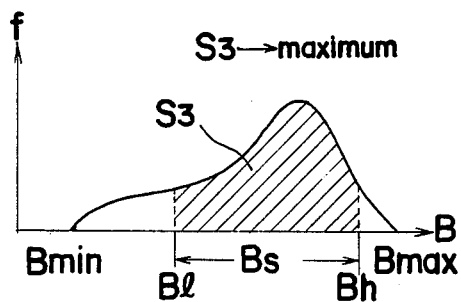
Figure 2D:
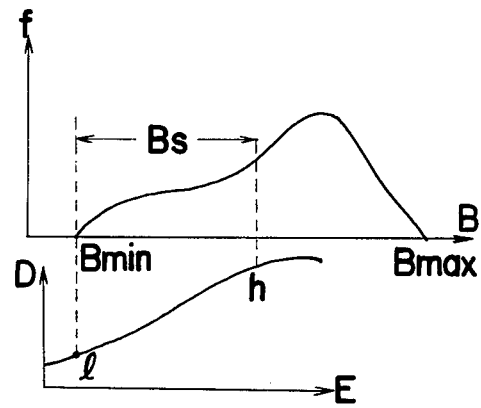
Figure 2E:
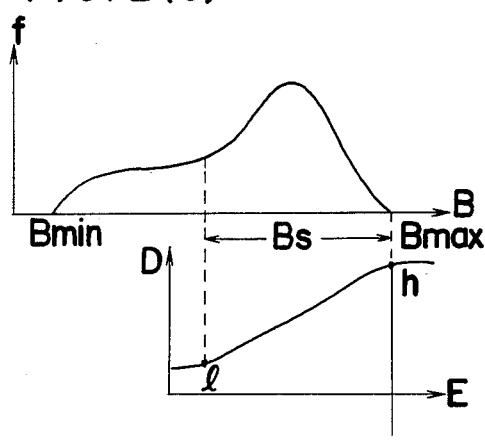
Figure 2F:
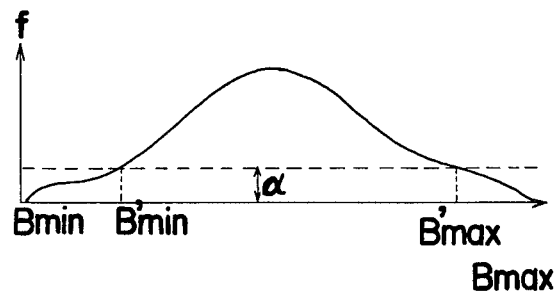
Figure 3:
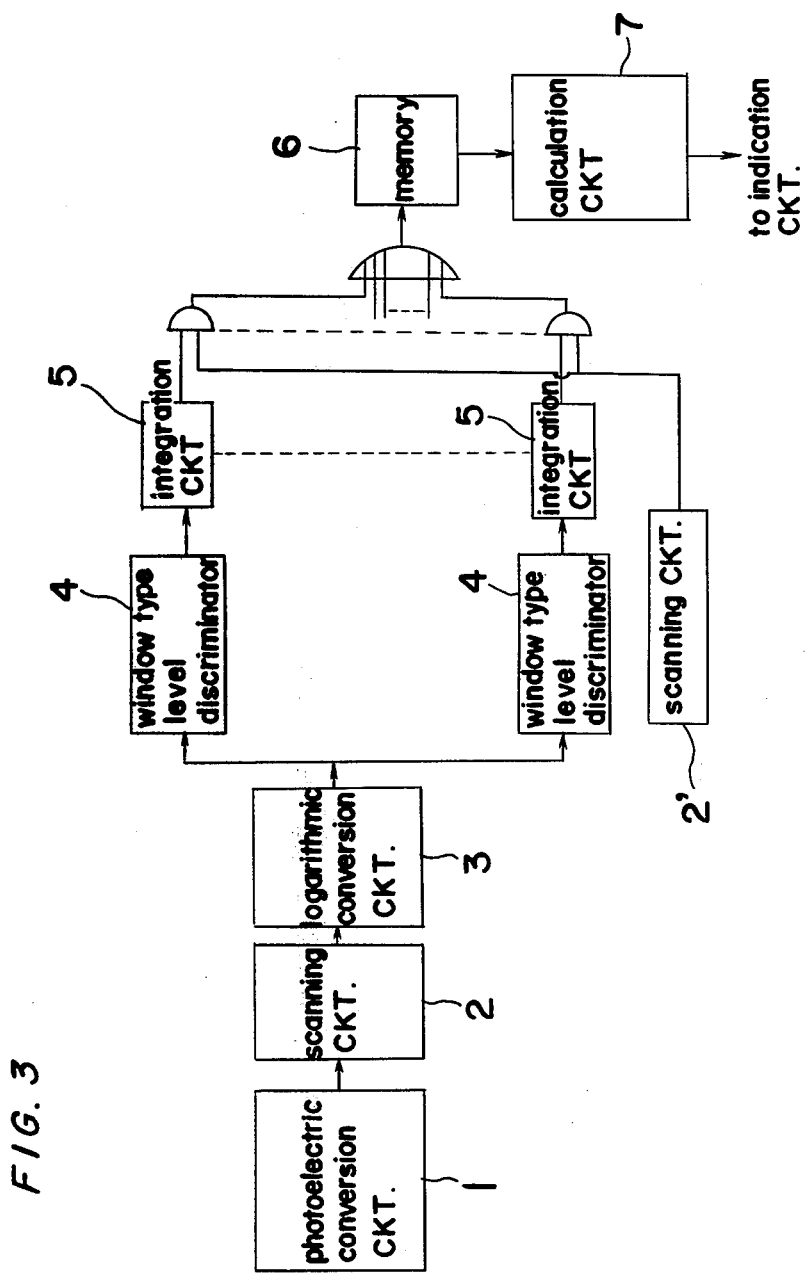
Figure 4:
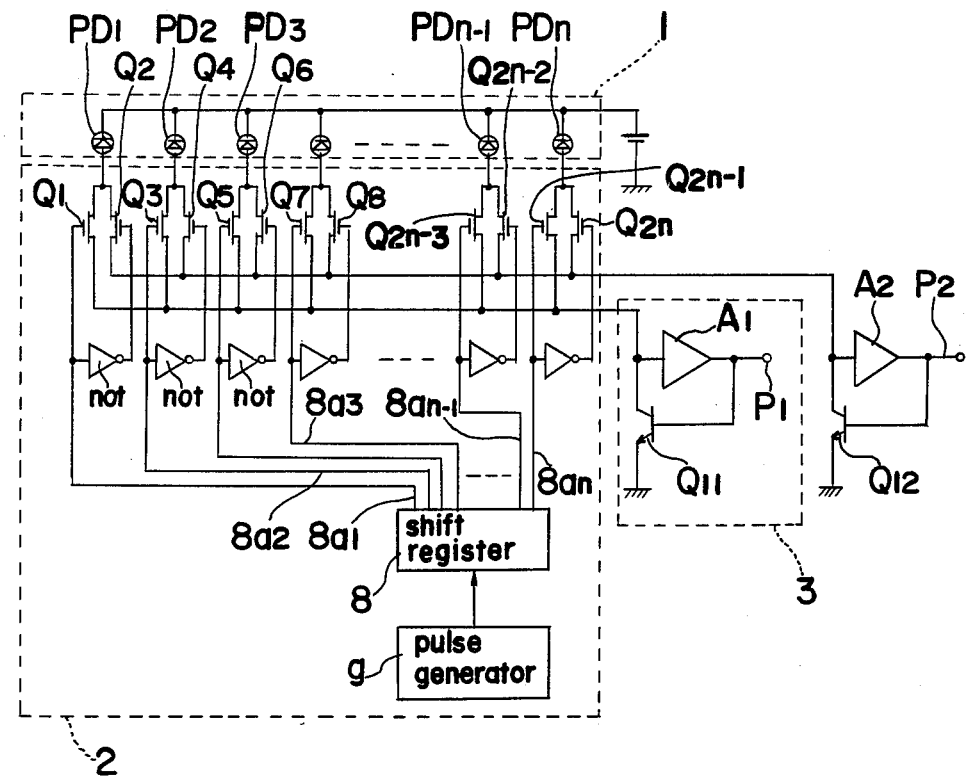
Figure 5:
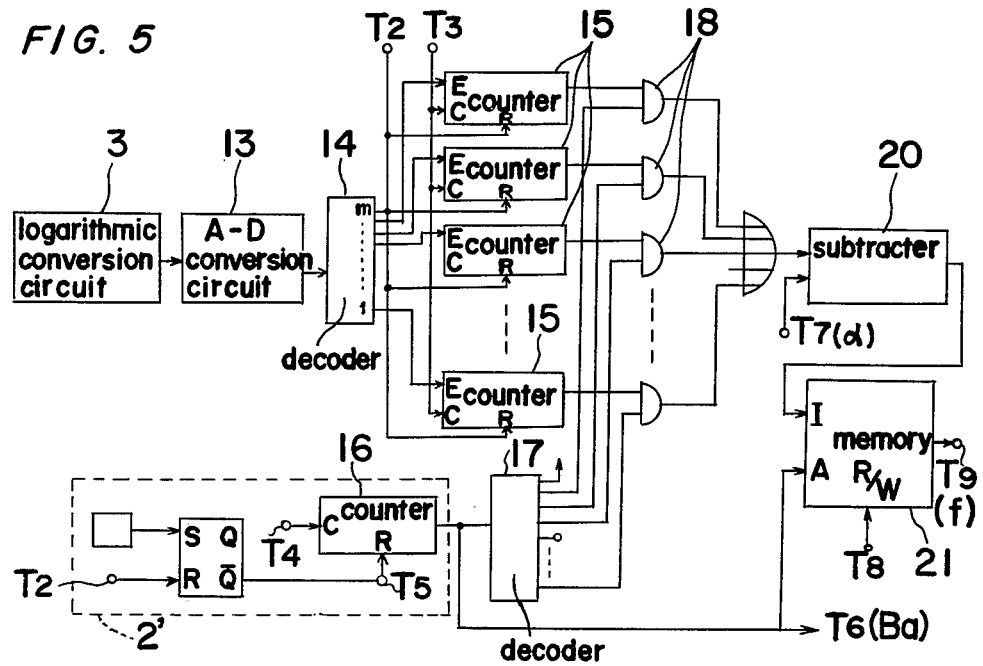
Figure 6:
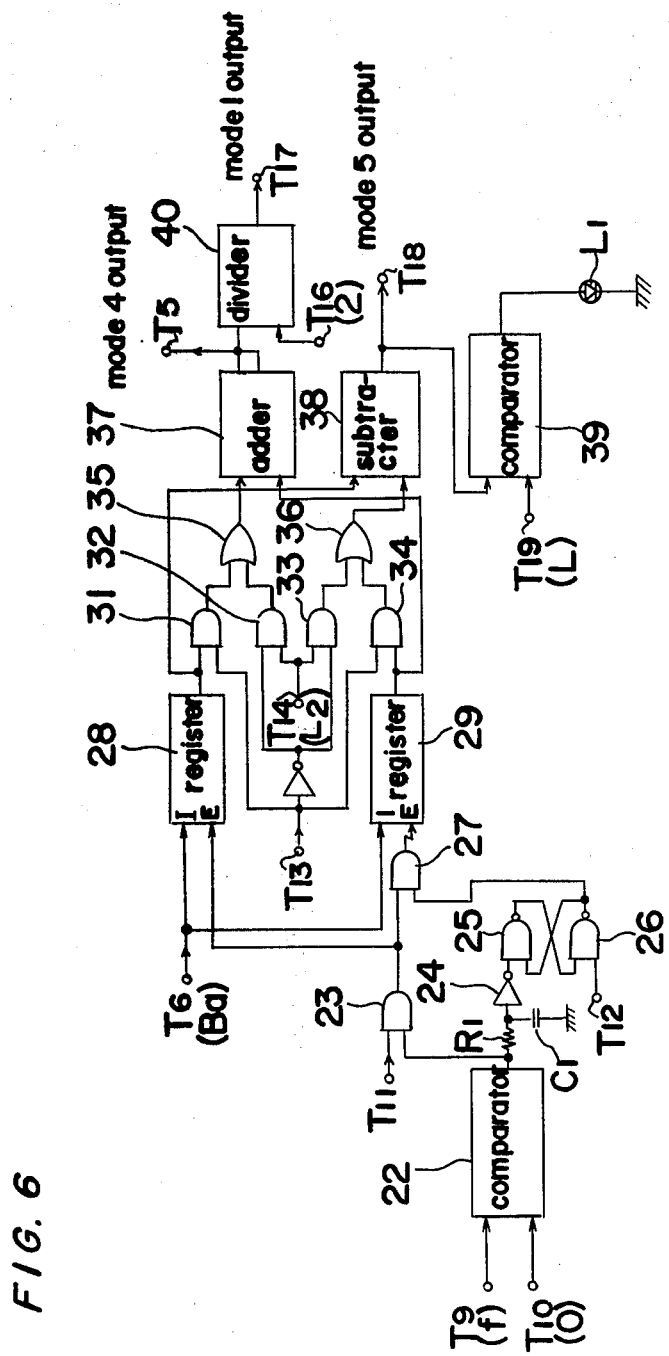

These and other objects and features of the present invention will become apparent from the following description of the preferred embodiment with reference to the accompanying drawings in which;

FIGS. 1(a) and 1(b) are graphs illustrating the relation between the frequency distribution of the brightness of a scene to be photographed and film latitude, FIGS. 2(a) to 2(f) are graphs illustrating the exposure amount determination systems employed in the present invention, FIG. 3 is an electrical block diagram illustrating the principle of an exposure meter according to the present invention, FIG. 4 is an electrical circuit diagram illustrating a circuit employed in the exposure meter of the invention for scanning the scene to be photographed to obtain a logarithmic conversion value of brightness at each point of said scene, FIG. 5 is an electrical circuit diagram illustrating a circuit for calculating frequency distribution of brightness employed in the exposure meter of the invention, FIG. 6 is an electrical circuit diagram illustrating a circuit employed in the exposure meter of the invention for realizing the exposure determination systems of FIGS. 2(a), 2(d) and 2(e).

Figure 9:
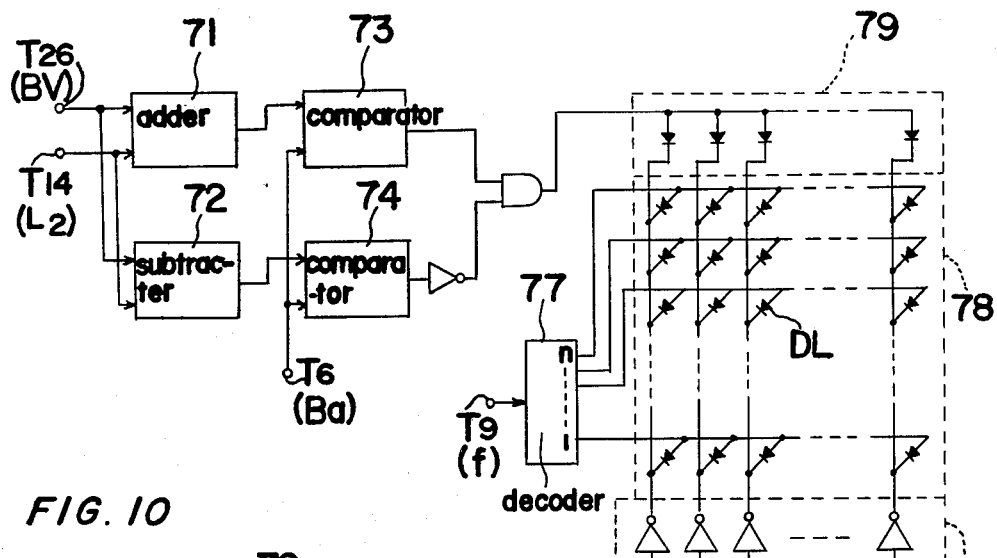
Figure 10:
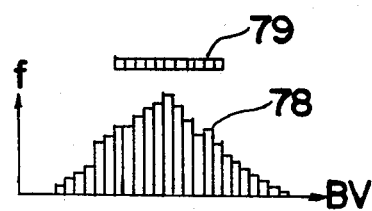
Figure 11:
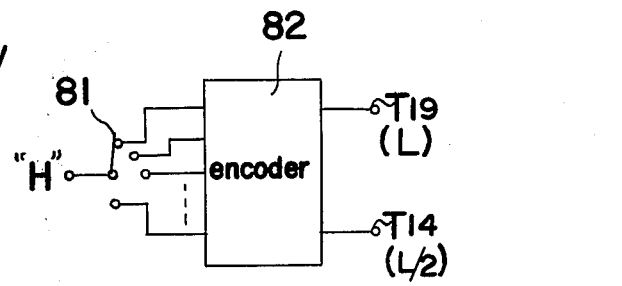
Figure 12:
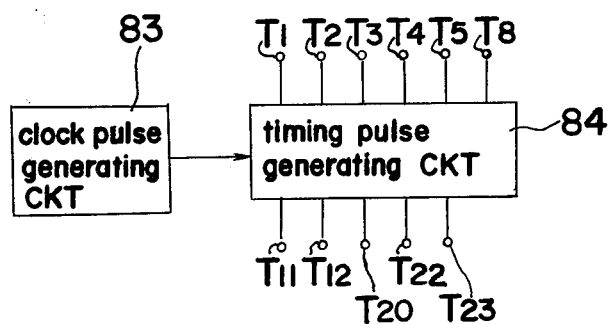

FIG. 7 is an electrical circuit diagram illustrating a circuit employed in the exposure meter of the invention for realizing the exposure determination systems of FIGS. 2(b) and 2(c), FIG. 8 is an electrical circuit diagram illustrating a circuit for indicating the exposure amount from the values computed by the circuits of FIGS. 6 and 7, FIG. 9 is an electrical circuit diagram illustrating a circuit employed in the exposure meter of the invention for indicating frequency distribution of brightness and film latitude, FIG. 10 is a diagram showing a pattern of indication according to the circuit of FIG. 9, FIG. 11 is an electrical block diagram of a circuit employed in the exposure meter of the invention for setting film latitude for various types of film, FIG. 12 is an electrical block diagram of a circuit employed in the exposure meter of the invention for generating timing pulses in the circuits of FIGS. 5 to 7.

Figure 13:
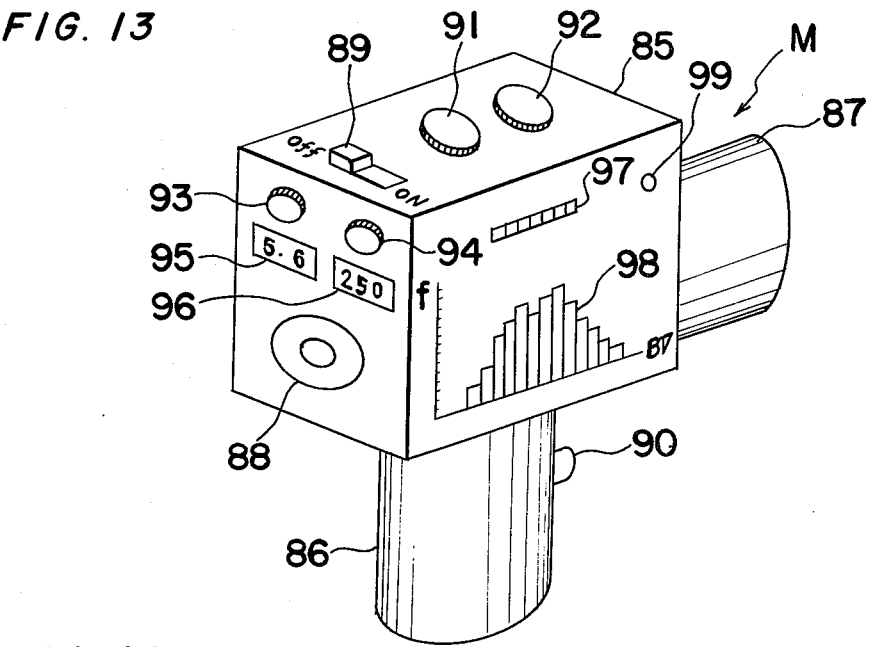
Figure 14:
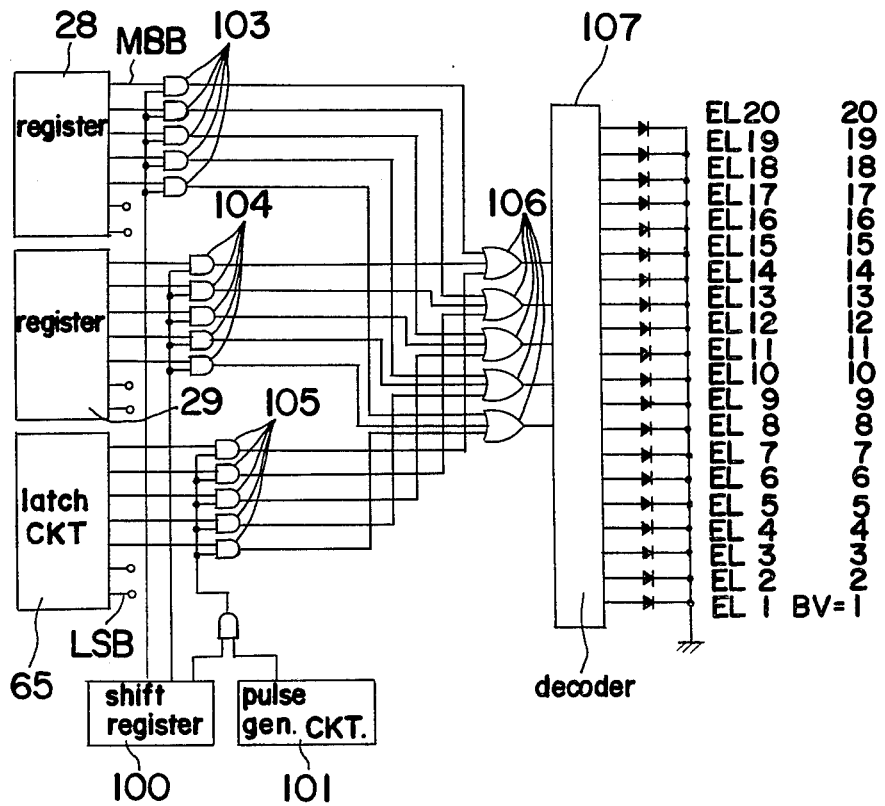
Figure 15:
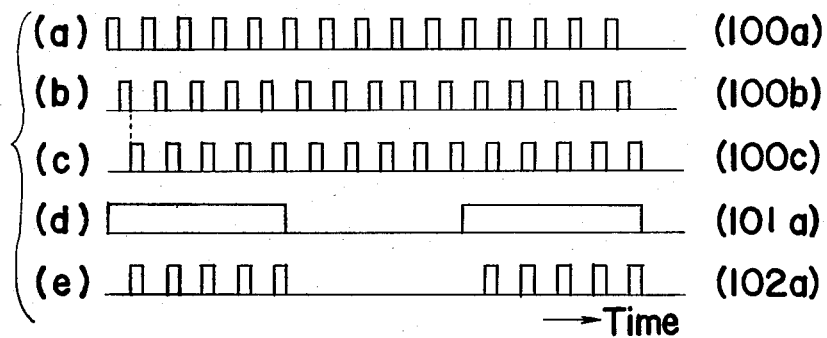
Figure 16:
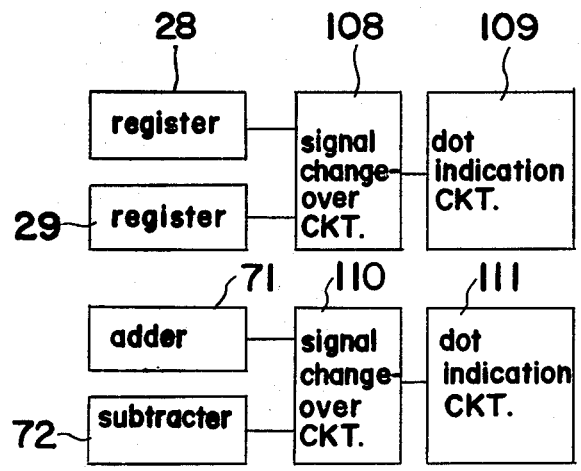
Figure 17:
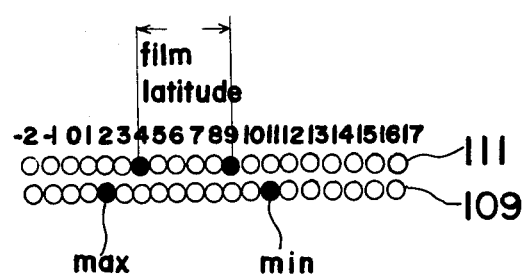

FIG. 13 is a perspective view showing the external appearance of the exposure meter according to the present invention, FIG. 14 is an electrical circuit diagram showing another embodiment of the indication circuit of the invention, FIG. 15 is a time chart showing the function the indication circuit of FIG. 14, FIG. 16 is an electrical block diagram showing a further embodiment of the indication circuit of the invention, and FIG. 17 is a fragmentary view showing an arrangement of an indicating surface according to the circuit of FIG. 16.

Before the description of the present invention proceeds, it is to be noted that like parts are designated by like reference numerals throughout several views of the accompanying drawings.

Referring now to the drawings, there is shown in FIG. 1(a) the brightness distribution in a scene to be measured for photographic exposure in which the abscissa and represents the logarithmic brightness B of the scene and the ordinate represents the frequency of occurrence f of each logarithmic brightness value. FIG. 1(b) illustrates the characteristic curve showing the relation between the logarithmic exposure amount E and the density D of the film. In FIG. 1(b), the exposure region Es represented by a diagonal straight line portion of the characteristic curve (between points Bl and Bh or El and Eh mentioned later) is the film latitude, and the determination the exposure amount E is deciding the position of the exposure region Es within the distribution of FIG. 1(a). The curve shown in FIG. 1(b) is shifted in parallel relation toward the right when exposure time is decreased, and toward the left when exposure time is increased. The same curve is shifted in parallel relation toward the right when diaphragm aperture opening is smaller and toward the left when the diaphragm aperture opening is larger.

According to the present invention, several kinds of exposure amount determinations are effected on the basis of FIGS. 1(a) and 1(b). These exposure amount determination systems are described hereinbelow with reference to FIGS. 2(a) to 2(f) also.

(1) As shown in FIG. 2(a), the center of the brightness region or film latitude $B_S$ is brought to a position or center C exactly intermediate between the maximum brightness Bmax and the minimum brightness Bmin of the brightness of the scene to be photographed (C=Bmin+Bmax/2 and the distance $B_1$ between the points Bmin and Bl equals the distance $B_2$ between points Bh and Bmax).

(2) As shown in FIG. 2(b), in the brightness distribution of the scene to be photographed, the areas $S_1$ and $S_2$ of those portions of the brightness distribution which are not covered by the film latitude $B_S$ are made equal to each other.

(3) As snown in FIG. 2(c), in the brightness distribution of the scene to be photographed, the area $S_3$ covered by the film latitude $B_S$ is maximized.

(4) As shown in FIG. 2(d), the lowest point l of the film latitude $B_S$ is brought into alignment with the minimum brightness Bmin of the brightness distribution.

(5) As shown in FIG. 2(e), the highest point h of the film latitude $B_S$ is aligned with the maximum brightness Bmax of the brightness distribution.

(6) As shown in FIG. 2(f), a new brightness distribution is formed by providing a line at level d in the brightness distribution chart intersecting with the latter at points B'min and B'max as shown and regarding the frequency distribution chart above the level $\alpha$ as the new brightness distribution for applying thereto the systems (1) to (5) as described above.

Referring now to FIG. 3, which illustrates the principle of construction of the exposure meter according to the present invention, a photoelectric conversion circuit 1 has many photoelectric elements (not shown) arranged on its frame surface. A scanning circuit 2 sequentially takes outputs from these photoelectric elements. After having been passed through a logarithmic converter 3, these outputs are classified into several brightness ranges by window type level discriminators 4. Each of the level discriminators 4 actuates an integration circuit 5 subsequent thereto when the level discriminator produces an output, for integration of time during which an output is produced from each of these level discriminators 4. The signal retained in each of the integration circuits 5 which represents the frequency of each brightness range is sequentially stored in a memory circuit 6 via another scanning circuit 2'. The values stored in the memory circuit are further fed into an operation or calculation circuit 7 to output therefrom signals indicating the exposure amount based on the various systems mentioned earlier with reference with FIGS. 2(a) to 2(f).

Note here that although in the foregoing description, the arrangement of the present invention is described with reference to an analog system, the concept of the present invention is not necessarily based on an analog system alone, but may readily be applicable to a digital system also. The embodiment described hereinbelow is based on a digital system. Note also that since the integrating circuits 5 (which are replaced by counters in the case of digital system) have an information retaining function, the memory circuit 6 may be dispensed with.

Referring now to FIG. 4, showing the detailed construction of the photoelectric conversion circuit 1, the scanning circuit 2 and the logarithmic conversion circuit 3 of FIG. 3, the outputs of photodiodes $PD_1$, $PD_2$, $PD_3 \ldots PD_{(n-1)}$ and $PD_n$ are coupled to either amplifier $A_1$ or $A_2$ through field effect transistors FET $Q_1$, $Q_2$, $Q_3$, $Q_4$, $Q_5$, $Q_6$, $Q_7$, $Q_8 \ldots Q_{(2n-3)}$, $Q_{(2n-2)}$, $Q_{(2n-1)}$ and $Q_{2n}$. The gate of each FET is connected to the gate of another in FET pair through a corresponding invecter circuit, and the source electrodes of both FET's in a pair are connected to corresponding photodiodes $PD_1$, $PD_2$, $PD_3 \ldots PD_{(n-1)}$ and $PD_n$. The FET'S are turned on when their gates receive a high level signal. Conduction and nonconduction of the field effect transistors in the left and right sides in each pair are opposite to each other. The gates of the field effect transistors FET $Q_1$, $Q_3$, $Q_5$, $Q_7 \ldots Q_{(n-1)}$ and $Q_{n1}$ on the left in each pair are connected to the output terminals of each bit of a shift register 8 through lead wires $8a1$, $8a2$, $8a3 \ldots 8a(n-1)$ and $8an$, and since a high level signal is read into the first bit of the shift register 8 upon actuation of the circuit and is shifted by the output pulses of a pulse generator g, the field effect transistors are turned on one by one in the order $Q_1$, $Q_3$, $Q_5 \ldots Q_{(2n-1)}$. The output current from the photodiodes $PD_1$, $PD_2$, $PD_3, \ldots PD_n$ is thus sequentially fed to the amplifier $A_1$. Negative feed back is applied by a transistor $Q_{11}$. The output current of the photodiodes is determined by the base-emitter voltage of the transistor $Q_{11}$, while the base-emitter voltage of the transistor $Q_{11}$ is determined by the output of amplifier $A_1$ so that the output current of the photodiodes becomes the collector current of the transistor $Q_{11}$ thus producing an output voltage at terminal $P_1$ of the amplifier $A_1$. Due to the exponential current-voltage characteristic of the base-emitter PN junction of transistor $Q_{11}$, the outputs of the photodiodes $PD_1$, $PD_2$, $PD_3$, $\ldots PD_n$ are subjected to a logarithmic conversion to become the output of $A_1$. The signals applied to the gates of the field effect transistors $Q_2$, $Q_4$, $Q_6$, $\ldots Q_{2n}$ on the right of each pair is inverted and applied to the gates of the field effect transistors $Q_1$, $Q_3$, $Q_4$, $\ldots Q_{(2n-1)}$ on the left of that pair. Only one of the group of the transistors $Q_1$, $Q_3$, $Q_5$, $Q_{(2n-1)}$ on the left of the transistor pairs is conducting during scanning, while all of the group of the transistors $Q_2$, $Q_4$, $Q_6$, $\ldots Q_{2n}$ on the right except one are conducting during the scanning. Accordingly, the amplifier $A_2$ receives signal equivalent to brightness of the entire scene, and this signal is subjected to logarithmic conversion by the transistor $Q_{12}$ to become the output at a terminal $P_2$ of the amplifier $A_2$. Thus the outputs of the photodiodes $PD_1$, $PD_2$, $PD_3$, $\ldots PD_n$ are subjected to the logarithmic conversion and are sequentially taken out from the terminal $P_1$ of the amplifier $A_1$ through scanning.

Referring now to FIG. 5, there is shown an embodiment of that portion in FIG. 3 including the level, the integrating circuits 5 and discriminators 4 the memory circuit 6. the output from the amplifier $A_1$ of FIG. 4, which is a brightness signal subjected to logarithmic conversion, is converted into a digital signal by an A-D conversion circuit 13 and applied to a decoder 14. The decoder 14 develops signal by one of its terminals 1 to m according to the value of the input signal, and the signal thus developed is counted by one of a number of counters 15. Pulses from the pulse generator g (FIG. 4) of the earlier mentioned scanning circuit are used for the read-in pulse signal $T_3$ for the counters 15, while the reset pulse $T_2$ is developed following the starting operation of the exposure meter arrangement. Upon completion of one scan of the photoelectric conversion circuit 1 (FIG. 3), resetting of a counter 16 is released by output from the last bit of the shift register 8, and the same counter 16 starts counting the pulses of the pulse generator g of FIG. 4. The counting output is applied to a decoder 17 which sequentially applies a high level signal to one of its output terminals 1 to m. Thus, a group of AND gates 18 is scanned, while each of the counters of the counter group 15 is sequentially read out. The arbitrarily set value $\alpha$ (FIG. 2($f$)) is subtracted from the value stored in the scanned counter of counter group 15 by a subtractor 20 and stored in the memory 21. In this case, the counting output of the counter 16 becomes circuit the address designation signal for the memory circuit 21. If the value $\alpha$ set in the subtractor 20 is zero, each of the exposure amount determination systems of FIG. 2($a$) to 2($e$) can be realized, while the system shown in FIG. 2($f$) is realized if the value $\alpha$ is any desired number different from zero.

Referring now to FIG. 6, there is shown an embodiment of a calculation circuit arrangement which performs the exposure amount calculation of the exposure amount determination systems described with reference to FIGS. 2($a$), 2($d$) and 2($e$). In FIG. 6, a comparator 22 compares the frequency value at the terminal $T_9$ read out from memory circuit 21 (FIG. 5) with a zero signal fed from terminal 10, and develops signal when the frequency value is positive. Note that since the frequency value stored in the memory circuit 21 is the value $\alpha$ subtracted from the real frequency value, this stored value may be negative in some cases. NAND gates 25 and 26 constitute a flip flop circuit, and when the storage function completion signal of the memory circuit 21, for example the of the decoder 17 (FIG. 5), with respect to the count $m+1$ of the counter 16 is impressed upon the terminal $T_{12}$, the output signal f on to the terminal 9 of the memory 21 is a high level signal to open the gate 27. The pulses from the pulse generator g of FIG. 4 are employed for reading out the memory 21, while the counter 16 is used for address designation. The above described reading out pulses are applied to a terminal $T_{11}$ of the gate 23, and when the output is developed from the comparator 22 indicating (the frequency value is positive), the gate 23 is opened to allow one read-out pulse to pass therethrough to be fed to the register 28 as a read-in pulse, while the same read-out pulse is also forwarded to the register 29 as read-in pulse through the gate 27 which has already been opened. The count value of the counter 16 is applied to the terminal $T_6$ of these registers 28 and 29, and the address of the memory circuit 21 at which the frequency value initially becomes positive is read into the registers 28 and 29. The address value of the memory circuit 21 is made to agree with value obtained by converting the brightness subjected to the logarithmic conversion into digital signal, and the address value read-in in the above described manner is the minimum brightness itself (Bmin in FIG. 2($f$)). When the first signal is emitted from the comparator 22, this signal is slightly delayed by a delay circuit including a resistor $R_1$ and capacitor $C_1$ and is applied to a NAND gate 25 through an inverter circuit 24 for causing the output of the NAND gate 26 to be a low level signal to close a gate 27. Accordingly, after the comparator 22 has emitted the first output signal to read-in the address in memory circuit 21 of the brightness Bmin into the register 29, no read-in signal is applied to the register 29 and thus the address of the brightness signal Bmin is retained therein. Meanwhile, in the register 28, because a high level signal is applied to gate 22 from the comparator 22 while the frequency value is positive, the gate 23 is left open, with the address being rewritten to correspond to the next memory location every time a pulse is applied to the terminal $T_{11}$. Thus, after the output of memory circuit 21 becomes negative, the register 28 stores the address in memory circuit 21 of the maximum brightness Bmax in FIG. 2($f$). To obtain the exposure amount based on the system of FIG. 2($a$), the terminal $T_{13}$ is a high level signal, by which gates 31 and 34 are opened, and the output of the register 28 is applied to an adder 37 through an OR circuit 35, while the output of the register 29 is directly applied to the same adder 37. Since the output from the adder 37 is divided by two a divider 40 when a control signal is applied through a terminal 16 to output the brightness value at the terminal $T_{17}$, the exposure amount may be determined in relation to this brightness value in such a manner that the center of film latitude is brought to this brightness value. At this time, since the outputs of the registers 28 and 29 are also applied to a subtracter 38 to provide the difference of the maximum brightness Bmax and minimum brightness Bmin (Bmax−Bmin), a warning is given by illuminating a light emitting diode $L_1$ when the difference Bmax−Bmin is larger than the film latitude L upon comparison in a comparator 39 of this difference with a value equivalent to the film latitude L applied to the terminal $T_{19}$.

Meanwhile, when the terminal $T_{13}$ is a low level signal, the exposure amount determination by the systems of FIGS. 2($d$) and 2($e$) can be realized, in which case, the gates 31 and 34 are closed, while gates 32 and 33 are opened. A signal having a value equivalent to one half of the film latitude L (L/2) appearing on terminal $T_{14}$ is applied to the adder 37 and subtracter 38 through the opened gates 32 and 33, while the output Bmax of the register 28 is applied directly to the subtracter 38 and the output Bmin of the register 29 is fed directly to the adder 37 thus providing a signal equivalent to (Bmin+L/2) from the addition circuit 37 at a terminal $T_{15}$ and a signal equivalent to (Bmax−L/2) from the subtracter 38 at a terminal $T_{18}$. Thus, since the former gives the brightness value based on the system of FIG. 2($d$) and the latter provides the brightness value on the basis of the system of FIG. 2($e$), the exposure amount may be determined by making the center of the film latitude to coincide with these brightness values.

Referring now to FIG. 7, there is shown a calculation circuit arrangement for computing the exposure amount based on the systems of FIGS. 2($b$) and 2($c$). The principle of the calculation is on the basis of the brightness distribution charts of FIGS. 2(b) and 2(c). In the charts, the point Bl is arbitrarily selected on the brightness axis and with another point Bh is selected at a position spaced by a distance equivalent to the film latitude $B_S$ from the point Bl toward the high brightness side. The circuit operates to obtain the integration $S_1$ from the brightness zero to the point Bl, the integration $S_3$ from the point Bl to the point Bh and the integration $S_2$ from the point Bh to the end of the high brightness side repetitively while advancing the position of the point Bl step by step from the brightness zero. The integrated values $S_1$ and $S_2$ are compared every time to find the brightness Be at which the values coincide with each other. If one half of the film latitude $B_S$ is added to the brightness B thus obtained, the exposure amount based on the system of FIG. 2(b) can be obtained. Meanwhile, by comparing the integrated value $S_3$ now obtained with the integrated value $S_3$ previously obtained to detect the brightness Bl when the integrated value $S_3$ reaches its maximum value, and adding one half of the film latitude to this brightness Bl, the exposure amount based on the system of FIG. 2(c) is obtained. Note here that the integration becomes addition in the digital calculation. In FIG. 7, a counter 41 is used for setting the brightness Bl as described above, and advances by one step whenever one integrating operation is completed for shifting the brightness value Bl toward the high brightness side. The counting output Ba of the counter 16 of FIG. 5 is applied to the terminal $T_6$ of the comparator 43 for comparison with the output of the counter 41 to produce a signal from the comparator 43 when the brightness Bl is equal to or larger than the counting output Ba (Bl≧Ba). Since the counting output of the counter 16 is an address designation signal for reading out from the memory circuit 21 and the address is made to coincide with the co-ordinates of the brightness axis of the brightness distribution chart, the integration is related to the portion $S_1$ of FIG. 2(b), while the signal is emitted from the comparator 43. The integration is changed over to that for the portion $S_3$ of FIG. 2(c) when the signal from the comparator 43 disappears. A signal equivalent to the film latitude L applied through a terminal $T_{19}$ is added to the output of the counter 41 by the adder 42 to provide the point Bh in FIGS. 2(b) and 2(c). This signal is compared with the counting output Ba of the counter 16 to emit signal from a comparator 44 when the counting output Ba is equal to or larger than the brightness Bh (Ba≧Bh). Accordingly, the integration for the portion $S_3$ is continued until this signal is emitted from the comparator 44, and the integration is changed over to that for the portion $S_2$ of FIG. 2(b) after emission of signal from the comparator 44. In the above arrangement, the period in which the signals from the comparators 43 and 44 are both absent is the period for the integration of the portion $S_3$. Therefore, the integration of the portion $S_3$ is effected while the signal obtained by inverting the outputs from comparators 43 and 44 in inverter circuits 45 and 46 and passing both of these outputs through the AND gate 47 is high, and during other periods, the integrations for the portions $S_1$ and $S_2$ are made. The integration is to be realized through a repetition of operations wherein the frequency read out from the memory circuit 21 is applied to an adder/subtracter 52 at terminal $T_9$ while the output from the adder/subtracter 52 is retained in an accumulator 51 for addition to the frequency subsequently read out from address of memory circuit in the adder/subtracter 52.

Still referring to FIG. 7, the exposure amount determination based on the system of FIG. 2(c) will be described hereinbelow. In this case, terminal $T_{24}$ at the junction of exclusive OR circuits 48 and 55 is set to be a low level, which is applied to exclusive OR circuits 48 and 55. The output from the exclusive OR circuit 48 is forwarded to the adder/subtracter 52 through the gate 49. When the signal from gate 49 is high, the adder/subtracter 52 performs an addition or a subtraction function. The change over between addition and subtraction is effected by the output of the comparator 44. When this output is high, that is when Ba≧Bh, subtraction is effected, while addition is carried out when this output is low. The AND gate 49 is opened when the output of comparator 50 is high. The comparator 50 compares the frequency read out from the memory circuit 21 appearing at the terminal $T_9$ with zero value signal appearing at terminal $T_{21}$, and produces high output when the result is positive. This procedure is necessary because the frequency stored in the memory circuit 21 is that obtained by subtracting the value $\alpha$ from the actual frequency and may be negative in some cases. As described in the foregoing, in this case the adder/subtracter 52 performs addition when the output of the exclusive OR circuit 48 is high, i.e., when the AND gate 47 is high because the outputs from the comparators 43 and 44 are both low, which means the frequencies are added to each other by the adder/subtracter 52 and accumulator 51 only when the brightness Ba is between the points Bl and Bh. The frequency the range of brightness points Bh>Ba>Bl is increased progressively and fed to a comparator 54. Meanwhile, the result of each progressive increase is stored in a register 53 to which the output signal of gate 56 is applied through a terminal $T_{28}$ and is read out after completion of one integration function and fed to the comparator 54 as an integrated value delayed by one integration time for comparison with the output of the adder/subtracter 52. Since the integration of the portion $S_3$ which is initially small gradually increases and subsequently starts to decrease again, if the comparator 54 is arranged as to produce a signal when the present integration is equal to or smaller than the previous integration, arrival of the portion $S_3$ having the maximum value may be detected. The output of the comparator 54 is applied as read-in signal to a register 57 through exclusive OR circuit 55 and AND gate 56, and the register 57 reads in the count value of the counter 41 at that time. This count value is the value of Bl increased step by step from zero, and if one half of the film latitude L is added to this value when $S_3$ is maximized by addition circuit 58, the brightness value for the center of the film latitude is produced at terminal $T_{25}$. The AND gate 56 is opened when the output m+1 of the decoder 17 (FIG. 5) is applied to a terminal $T_{23}$, because the counting of the counter 16 is returned to zero to restarting counting immediately after counting up to m+1.

More specifically, in order to obtain the maximum value of the portion $S_3$, it is necessary to retain the previous maximum value of the portion $S_3$ for comparison. Accordingly, the result of comparison by the comparator 54 is utilized, and when the output thereof is positive, i.e., when the output of the adder/subtracter circuit 52 is larger than the maximum value of $S_3$ of the previous portions $S_3$ thus compared, the output of the adder/subtracter circuit 52 is stored in the register 53.

The calculating function based on the system of FIG. 2(b) will be explained hereinbelow. In this case, terminal $T_{24}$ is a high level signal, and thus the exclusive OR circuit 48 has produces a high level output when the brightness Ba is smaller than Bl or larger than Bh. The adder/subtracter 52 functions only during this period and is changed over in its addition and subtraction function to be adding when Ba<Bl and to be subtracting when Ba≧Bh. The above function is equivalent to the function of subtracting any integration of $S_2$ from that of $S_1$, and the increase or decrease in the output of the adder/subtracter 52 is checked in a manner similar to that described earlier. Since the function as described above is started from a position where the area of the portion $S_1$ is zero for the initial stage, the output of the adder/subtracter 52 is first negative (not necessarily negative in normal cases) and then gradually increases. Accordingly, the initial output of the comparator 54 is high, and changes over to low when the portion $S_1$ becomes equal to or larger than the portion $S_2$ ($S_1 \geq S_2$). The point at which the output of the comparator 54 changes over to zero is the point to be detected, and the output of the exclusive OR circuit 55 becomes high when the output of the comparator 54 becomes low because the input to the terminal $T_{24}$ is high. The gate 56 is thus that the output m+1 of the decoder 17 is forwarded to the register 57 as read enable pulse to read in the count value Bl of the counter 41 at that time, and by the addition thereto of one half of the film latitude by the adder 58, the desired value of brightness is obtained.

The foregoing operation may be summarized in Table 1 below for better understanding.

Table 1

| Memory address | | Ba | |
|---|---|---|---|
| Count Valve of counter 41 | | Bl | |
| Bl + film latitude L | | Bh | |
| | Ba < Bl | Bl < Ba < BH | Bh < Ba |
| Output of comparator 43 | High | Low | Low |
| Output of comparator 44 | Low | Low | High |
| Output of AND gate 47 | Low | High | Low |
| Terminal $T_{24}$ Low (FIG. 2(c)) | | | |
| Output of exclusive OR 48 | Low | High | Low |
| Function of adder/subtracter 52 | No function | Addition | No function |
| Terminal $T_{24}$ High (FIG. 2(b)) | | | |
| Output of exclusive OR 48 | High | Low | High |
| Function of adder and subtracter 52 | Addition | No function | Subtraction. |

Note here that, although the counter 41 is advanced step by step whenever one integrating operation has been completed, one integration function is effected by one scan of reading out of the memory circuit 21 and the completion of this reading out is represented by an output of m+1 (the memory circuit has up to m addresses) from the counter 16, and therefore, the counter 41 is advanced by an output m+1 from the decoder 17.

Referring now to FIG. 8 showing an exposure indication circuit, a mode change over switch 59 is provided for change over of the exposure amount indication system to be used for indication of the exposure amount, and is adapted to selectively open only one of AND gates 60, 61, 62 and 63 each having one input terminal connected to one of the contacts 1 to 4 of the switch 59. The calculation output terminals $T_{17}$, $T_{25}$, $T_{15}$ and $T_{18}$ earlier mentioned with reference to FIGS. 6 and 7 are connected to the other input terminals of the respective AND gate 60 and 63. The selected brightness value is retained in a latch circuit 65. The brightness value thus retained in the latch circuit 65 and film sensitivity $S_V$ from a terminal $T_{27}$ are added to each other in an adder 67. The diaphragm aperture value of the f number is subtracted from the result of this addition in a subtracter 68 in the case of aperture priority exposure measuring, while the set shutter speed is subtracted in the same subtracter 68 in the case of shutter speed priority exposure measuring. The result of this subtraction is converted into the exposure amount by decoder 69 for indication by an indicating portion 70. To change-over between the aperture priority and shutter speed priority systems, there is provided a change over switch 66 whose common terminal is connected to the subtracter 68, and this common terminal is selectively connected to contact a to input the aperture value or f number AV into the subtracter 68 in the case of the aperture priority or contact b to input the set shutter speed value TV into the circuit 68 in the case of the shutter seed priority.

Referring now to FIGS. 9 and 10, there is shown a circuit arrangement for indicating the brightness distribution of the scene to be photographed and the film latitude. The frequency signal read out from the memory circuit 21 (FIG. 5) is applied to a decoder 77 through a terminal $T_9$. The decoder 77 is arranged to emit signals to illuminate the light emitting diodes corresponding in number to the frequency signal read out from memory circuit 21 and and develop signals at one of its output terminals 1 to n according to the frequency for applying a high level signal to one of the abscissas of an LED matrix 78. The ordinates of the matrix 78 are normally kept at a high level, and when the output of the decoder 17 (FIG. 5) is sequentially scanned from the left and inverted by an inverter group 80, the ordinate corresponding to the designated address of the memory circuit 21 becomes a low level for illuminating the light emitting diode DL at the intersection of the abscissa of high level and ordinate of low level. As the reading out from the memory circuit 21 is repeated, light emitting diodes DL arranged in the matrix 78 inside of a curve representing the brightness distribution are illuminated. Meanwhile, the output $B_V$ (central brightness according to the designated exposure determination system) of the latch circuit 65 (FIG. 8) is applied to adder 71 and subtracter 72 through a terminal $T_{26}$. Additionally, one half of the film latitude L (L/2) is also applied to the same adder 71 and subtracter 72 through the terminal $T_{14}$ for calculating $B_V + L/2$ and $B_V - L/2$. The results of these calculations are subsequently compared with the counting output Ba of the address designating counter 16 (FIG. 5) by comparators 73 and 74. When $B_V - \frac{1}{2} < Ba < B_V + \frac{1}{2}$ output signals are developed from the comparators 73 and 74, and by logical product of the output from the comparator 73 and inverse of the output of the comparator 74 a high level signal is applied to the anodes of the light emitting diode array 79 since the cathodes of the same array 79 are connected to the output of the decoder 71 (FIG. 5), the light emitting diodes DL within the width equivalent of the film latitude about the central brightness determining the exposure amount based on the predetermined exposure determinating system are illuminated in the light emitting diode array 79 for indicating the relation between the brightness distribution and the film latitude. FIG. 10 shows an actual pattern of such an indication.

Referring now to FIG. 11 showing a circuit for forming the film latitude L into codes according to kinds of film, a film selection switch 81 is coupled to an encoder 82 which develops coded digital signals of the film latitude and a value of one half of the film latitude according to positions of the film selection switch 81. Generally, since films have different film latitudes depending on the kinds of film, it is necessary to alter the film latitude according to the kinds of film in the exposure determination. The output terminal and $T_{14}$ of the encoder 82 is connected to AND gates 32 and 33 of FIG. 6, to the adder 58 of FIG. 7 and to adder 71 and subtracter 72 of FIG. 9. The output terminal $T_{19}$ of the encoder 82 is connected to comparator 39 of FIG. 6 and to adder 42 of FIG. 7.

In FIG. 12, there is shown a pulse generating circuit for imparting timing pulses to each part of the circuits explained in the foregoing description. Note that although in the foregoing description, various timing pulses are described as obtained suitably by the pulse generator g, shift register 8, counter 16, decoder 17 of FIGS. 4 to 5, it is more convenient in actual practice to produce these timing pulses by the pulse generating circuit illustrated in FIG. 12 including a clock pulse generating circuit 83 and timing pulse generating circuit 84. The circuit 84 includes a counter which develops pulses on terminals $T_1$, $T_2$, $T_3$, $T_4$, $T_5$, $T_8$, $T_{11}$, $T_{12}$, $T_{20}$, $T_{22}$ and $T_{23}$ to be connected to the terminals having like symbols in FIGS. 5 to 9.

Referring now to FIG. 13 showing the external appearance of the exposure meter of the invention, the exposure meter M generally includes a housing 84 having a cubic box-like configuration, a grip 86 extending downward from the lower portion of the housing 85, a zoom lens assembly 87 for the exposure meter mounted on the front side of the housing 85 and an eye piece 88 mounted on the rear side of the same housing 85 for aiming the exposure meter at the subject or scene to be measured for exposure through the lens assembly of eye piece 88. Further included in the exposure meter M are a main switch 89, an exposure system determining switch 91 and a film sensitivity setting dial 92 which are mounted on the upper portion of the housing 85, an aperture setting dial 93, with an indication window 95 and a shutter speed setting dial 94 with an indication window 96 which are arranged above the eye piece 88, a row 97 of light emitting diodes (equivalent to the LED array 79 of FIG. 9) for indicating the film latitude, a matrix 98 of light emitting diodes for the brightness distribution indication of the scene to be measured for exposure (equivalent to the LED matrix 78 of FIG. 9) and a lamp 99 for warning that the width of the brightness distribution is wider than the film latitude L (equivalent to the light emitting diode $L_1$ of FIG. 6) which are disposed on one of the side walls of the housing 85, and a light measuring starting switch 90 mounted on the grip 86.

Referring now to FIG. 14, there is shown another embodiment of a circuit for indicating the result of calculation. In this embodiment, the registers 28 and 29 retain the maximum brightness and the minimum brightness as described with reference to FIG. 6, while the latch circuit 65 retains the brightness value calculated using the selected system of the various systems as explained with reference to FIG. 8. Note that in the arrangement of FIG. 14, although these registers 28 and 29 and latch circuit 65 are composed of seven bits which are capable of indicating brightness ranges of only twenty stages at 1 Ev unit each are utilized in this embodiment. The AND gate groups 103, 104 and 105 are sequentially opened for a predetermined period of time by the output of each bit of a shift register 100, while data equivalent to the upper five bits of the registers 28 and 29 and latch circuit 65 are successively forwarded to a decoder 107 through OR circuit group 106. A signal is developed on one of the twenty output terminals of the decoder 107 corresponding to the brightness of the twenty ranges for illuminating the particular light emitting diode of the diodes $EL_1$, $EL_2$, $EL_3$, ... $EL_{20}$ which is connected to the corresponding one of the output terminals. In the manner as described above, the maximum brightness, minimum brightness and the brightness for fitting the center of the film latitude are sequentially displayed in the row of the diodes $EL_1$, $EL_2$, $EL_3$, ... $EL_{20}$, and by repetition scanning of the groups of AND gates 103, 104 and 105, the above three kinds of brightness are displayed time divisionally by high speed energization and de-energization of the light emitting diode group so as to visually present a continuous indication. In other words, the width of the brightness distribution of the scene to be measured for exposure and the set location of the center of brightness for exposure are thus indicated. Additionally, although the output of the latch circuit 65 for indicating the center of the brightness for exposure is forwarded to the decoder 107 time divisionally together with the other brightness information, it is further arranged to control the group gate 105 by output pulses from a pulse generator 101 having a longer period than the shift pulses of the shift register 100 for visual indication apart from that for the maximum and minimum brightness. In FIG. 15, the output pulses of respective bits of the shift register 100 are shown in (a), (b) and (c), and the output pulses of the pulse generator 101 are given in (d), while a time chart of energization and de-energization of the exposure center brightness indication is shown in (e).

Referring now to FIGS. 16 and 17, there is shown in FIG. 16 a block diagram of a further embodiment of the indication circuit. In this embodiment, there are provided dot indication circuits 109 and 111, each including light emitting diodes arranged in a row as shown in FIG. 17. The row for the circuit 109 shows the maximum and minimum brightness, while the row for the circuit 111 indicates the brightness at opposite ends of the film latitude. Since the registers 28 and 29 retain the values for the maximum and minimum brightness these values are converted into signals indicating which light emitting diodes should be illuminated by a signal conversion circuit 108 for illuminating the two corresponding elements in the row for the circuit 109. The brightness values at the opposite end portions of the film latitude are provided by the adder 71 and the subtracter 72 in the manner described in relation to FIG. 9, and therefore, the outputs from these circuits 71 and 72 are forwarded to a signal conversion circuit 110 to illuminate two corresponding elements of the row of light emitting diodes of the dot indication circuit 111 while the signals from the registers 28 and 29 are forwarded to the signal change over circuit 108 for similar indication in the circuit 109. Note that since the indication can be effected without time division, the arrangement for the time division described as employed in FIG. 14 is not required.

As is clear from the foregoing description, since calculations for the exposure amount determination based on various systems can be readily effected according to the exposure meter of the present invention, if the effect on the photographs taken by each of these systems is preliminarily known, it is possible for any person to determine the optimum amount of exposure for obtaining the desired effect in the photographs.

Note that the present invention is constructed as defined in the appended claims and includes the following embodiments.

(1) The position of the film latitude within the width of brightness distribution is determined such that the central portion of the brightness distribution width coincides with the center of the film latitude. Accordingly, a means for obtaining the average value of the maximum brightness and minimum brightness is provided;

The position of the film latitude within the width of the brightness distribution is determined so that the sum of the frequency of brightness occurrence outside of the film latitude at the high brightness side and at the low brightness side are equal to each other;

(3) The position of the film latitude within the width of brightness distribution is calculated so that the total sum of occurrence the frequency of brightness at each brightness range within film latitude is maximized.

(4) The calculations based on the conditions in the above items (2) and (3) includes a means for designating a desired brightness Bl on the brightness axis in the brightness frequency distribution obtaining a value Bh which is the film latitude L added to the brightness Bl and carrying out integration by dividing the frequency distribution of brightness into three integrating zones of brightness, i.e., zero to Bl, Bl to Bh, and over Bh;

(5) The position of the film latitude within the width of brightness distribution is determined so that the minimum brightness of the film latitude coincides with the minimum brightness of the brightness distribution;

(6) The position of the film latitude within the width of brightness distribution is determined so that the maximum brightness of the film latitude coincides with the maximum brightness of the brightness distribution width;

(7) A new brightness frequency distribution is obtained by uniformly subtracting the value α from the frequency distribution value of the brightness frequency distribution and the position of the film latitude within the width of the new brightness distribution is determined based on the conditions of each of the foregoing items (1), (2), (3), (5) and (6). frequency distribution;

(8) A matrix of light emitting elements indicates the frequency distribution on the basis of the output of the frequency distribution calculating means;

(9) The maximum brightness and minimum brightness of the scene brightness are indicated by illuminating of two light emitting elements of a row of the light emitting elements; and

(10) The film latitude is indicated by illumination of two light emitting elements of a row of light emitting elements.

Although the present invention has been fully described by way of example with reference to the attached drawings, note that various changes and modifications are apparent to those skilled in the art. Therefore, unless such changes and modifications otherwise depart from the scope of the present invention, they should be construed as included therein.

What is claimed is:

1. An exposure meter for use in photography comprising:
   a means for measuring the brightness of a scene to be photographed at a plurality of places;
   a means for calculating the frequency distribution of brightness of said scene by dividing the measured brightness into a plurality of ranges and counting the number of said plurality of places having measured brightness within each of said plurality of brightness ranges; and
   a means for calculating the exposure amount at which the film exposure latitude of a film to be used in the photography is in a predetermined relationship relative to said frequency distribution of brightness of said scene.

2. An exposure meter for use in photography as claimed in claim 1, wherein said means for calculating the exposure amount further comprises:
   a change over means for selecting one of a plurality of predetermined relationships of the film latitude relative to said frequency distribution of brightness of said scene.

3. An exposure meter as claimed in claim 1, wherein:
   said predetermined relationship comprises the center of the film latitude being midway between the maximum brightness and the minimum brightness of the scene to be photographed.

4. An exposure meter as claimed in claim 1, wherein:
   said predetermined relationship comprises the number of said plurality of places having brightness less than the minimum of the film exposure latitude being equal to the number of said plurality of places having brightness greater than the maximum of the film exposure latitude.

5. An exposure meter as claimed in claim 1, wherein:
   said predetermined relationship comprises having the maximum number of said plurality of places with brightness within the film exposure latitude.

6. An exposure meter as claimed in claim 1, wherein:
   said predetermined relationship comprises the minimum of the film exposure latitude being equal to the minimum brightness of the scene to be photographed.

7. An exposure meter as claimed in claim 1, wherein:
   said predetermined relationship comprises the maximum of the film exposure latitude being equal to the maximum brightness of the scene to be photographed.

8. An exposure meter as claimed in claim 1, wherein:
   said means for calculating the frequency distribution of brightness comprises means for counting the number of places exceeding a predetermined number, which places have a measured brightness within each of said plurality of brightness ranges.

* * * * *